United States Patent
Zhang et al.

(10) Patent No.: US 7,340,843 B2
(45) Date of Patent: Mar. 11, 2008

(54) VERTICALITY EXAMINING APPARATUS HAVING SENSORS

(75) Inventors: Bing-Jun Zhang, Shenzhen (CN); Yu-Ping Wu, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/728,480

(22) Filed: Mar. 26, 2007

(65) Prior Publication Data

US 2007/0220768 A1   Sep. 27, 2007

(30) Foreign Application Priority Data

Mar. 24, 2006   (TW) ................................ 95110318 A

(51) Int. Cl.
    *G01B 5/25* (2006.01)
(52) U.S. Cl. ............................ 33/533; 33/1 BB; 33/551
(58) Field of Classification Search ................ 33/533, 33/549, 551–553, 1 BB See application file for complete search history.

(56) References Cited

U.S. PATENT DOCUMENTS

| | | | |
|---|---|---|---|
| 6,275,032 B1* | 8/2001 | Iwata et al. ................... | 33/533 |
| 6,866,393 B2 | 3/2005 | Yano et al. | |
| 7,131,211 B2* | 11/2006 | Kirstine ....................... | 33/552 |
| 2007/0240322 A1* | 10/2007 | Li et al. ....................... | 33/533 |

* cited by examiner

*Primary Examiner*—Yaritza Guadalupe-McCall
(74) *Attorney, Agent, or Firm*—Wei Te Chung

(57) ABSTRACT

An exemplary verticality examining apparatus (1) includes three first sensors, two second sensors, and a plurality of sensor-indicators. Outmost extremities of the first sensors cooperatively define an imaginary single plane, and are configured for physically contacting a first side of an object to be examined. The second sensors are configured for simultaneously physically contacting a second side of the object when the first side of the object contacts the first sensors if the object has verticality as between the first side and the second side thereof. The sensor-indicators are electrically connected to the first and second sensors and are configured for indicating states of the first and second sensors with respect to any physical contact with the object.

15 Claims, 7 Drawing Sheets

VERTICALITY EXAMINING APPARATUS HAVING SENSORS

FIELD OF THE INVENTION

The present invention relates to an apparatus for examining the verticality of a product such as a liquid crystal display, and more particularly to a verticality examining apparatus having a number of sensors.

GENERAL BACKGROUND

Liquid crystal displays are commonly used as display devices for compact electronic apparatuses, because they not only provide good quality images but are also very thin. A verticality examining apparatus is generally needed for achieving accurate white balance of each liquid crystal display in mass manufacturing of liquid crystal displays.

Referring to FIG. 7, a typical verticality examining apparatus 7 for a liquid crystal display includes a locating member 71 and a supporting member 72 supporting the locating member 71. The locating member 71 includes a base 73, a tall locating arm 74, and a short locating arm 75.

The base 73 includes a bar-shaped main arm 731, and two subsidiary arms 733 perpendicularly extending in a same direction from respective opposite ends of a long side of the main arm 731. The main arm 731 includes two pairs of sliding channels 7312 located at opposite ends thereof respectively. The tall locating arm 74 can slide along a first pair of the sliding channels 7312, and the short locating arm 75 can slide along a second pair of the sliding channels 7312. The short locating arm 75 includes a first reference surface 751. The tall locating arm 74 includes a second reference surface 741 coplanar with the first reference surface 751, and a third reference surface 743 perpendicularly connecting with the second reference surface 741. Thus the second and third reference surfaces 741, 743 cooperatively define an essentially rectangular corner.

Referring also to FIG. 8, an operation of examining the verticality of a liquid crystal display 76 by using the verticality examining apparatus 7 is typically as follows. Front portions (not labeled) of the liquid crystal display 76 are positioned to contact the first and second reference surfaces 751, 741, and a right side portion (not labeled) of the liquid crystal display 76 is observed by a human operator as to whether it sufficiently contacts the third reference surface 743 or not. Thereby, the verticality of the liquid crystal display 76 is assessed, and a determination is made as to whether the verticality is satisfactory or not.

In summary, the verticality of the liquid crystal display 76 is determined by observing whether the side portion of the liquid crystal display 76 sufficiently contacts the third reference surface 743 or not. This process involves manual work, and relies on a human operator's judgment. The process is somewhat inefficient, and may result in an inaccurate observation or an incorrect determination being made.

What is needed, therefore, is a verticality examining apparatus that can overcome the above-described deficiencies.

SUMMARY

In one preferred embodiment, a verticality examining apparatus includes three first sensors, two second sensors, and a plurality of sensor-indicators. Outmost extremities of the first sensors cooperatively define an imaginary single plane, and are configured for physically contacting a first side of an object to be examined. The second sensors are configured for simultaneously physically contacting a second side of the object when the first side of the object contacts the first sensors if the object has verticality as between the first side and the second side thereof. The sensor-indicators are electrically connected to the first and second sensors and are configured for indicating states of the first and second sensors with respect to any physical contact with the object.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
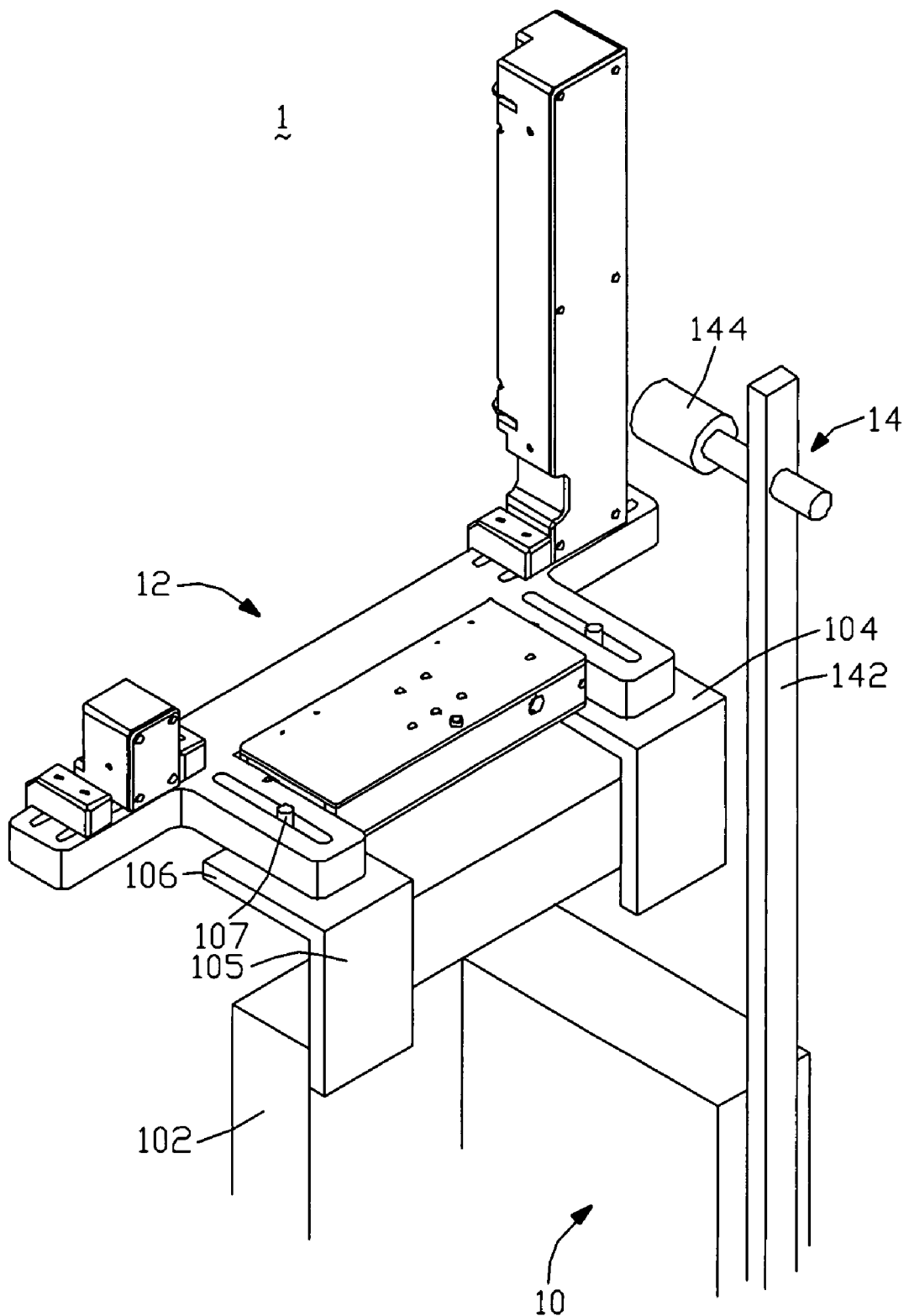
FIG. 1 is an isometric, back view of a verticality examining apparatus according to an exemplary embodiment of the present invention, the verticality examining apparatus including a locating member.

Referring to FIG. 1, a verticality examining apparatus 1 according to an exemplary embodiment of the present invention is shown. The verticality examining apparatus 1 includes a supporting member 10, a locating member 12, and an observing member 14.

The supporting member 10 includes a main body 102, and two L-shaped supporting arms 104 fixed to the main body 102. Each supporting arm 104 includes a first plate 105 fixed to the main body 102, and a second plate 106 perpendicularly extending from the first plate 105. The second plates 106 of the supporting arms 104 are parallel to each other and extend in a same direction. Top portions of the second plates 106 are coplanar. Each supporting arm 104 further includes a roller 107, which perpendicularly extends up from the top portion of the respective second plate 106.

The observing member 14 includes a vertical bar 142, and an observing scope 144 fixed to an upper portion of the bar 142. The observing scope 144 includes a lens (not shown). The lens has a pair of crosshairs marked on an outmost surface thereof. The crosshairs perpendicularly cross each other at a center of the lens, thereby providing an alignment cross for a user of the observing scope 144. A height of the observing scope 144 relative to the supporting member 10 can be adjusted as required. Typically, the bar 142 is adjustable in order to move the observing scope 144 as required.

Figure 2:
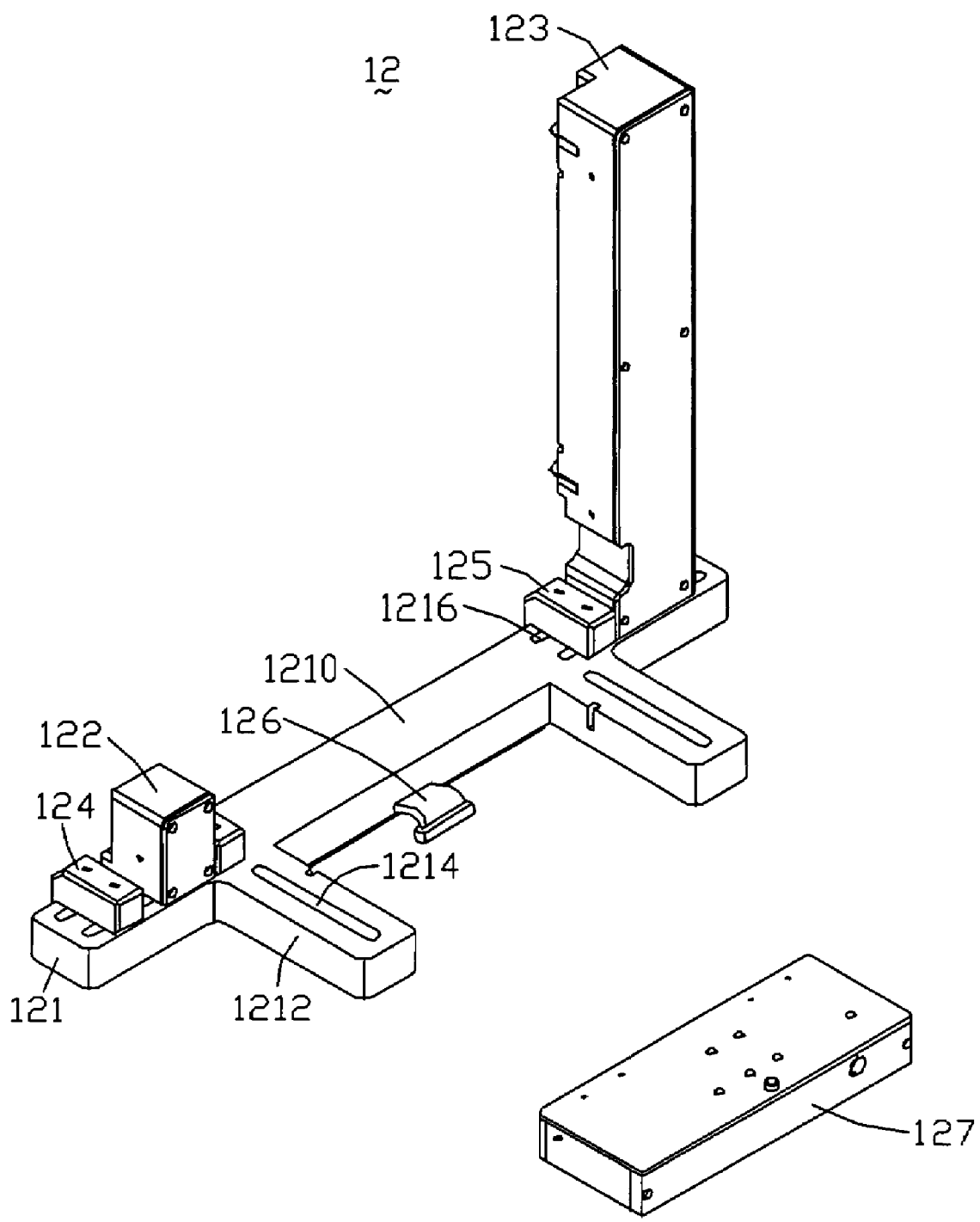
FIG. 2 is an exploded view of the locating member of FIG. 1.

Referring also to FIG. 2, the locating member 12 includes a base 121, a short locating arm 122, a tall locating arm 123, two first location blocks 124, a second location block 125, a flexible printed circuit (FPC) 126, and a control circuit box 127. The base 121 includes a main arm 1210, and two subsidiary arms 1212 perpendicularly extending in a same direction from a long side of the main arm 1210. The subsidiary arms 1212 and the main arm 1210 are essentially bar-shaped, and the subsidiary arms 1212 are parallel to each other. Each subsidiary arm 1212 includes a first through channel 1214 located along a length thereof. A transverse width of the first through channel 1214 corresponds to a width of each of the rollers 107. That is, the base 121 can slide relative to the observing scope 144, with the subsidiary arms 1212 moving along the second plates 106, and the rollers 107 turning on their own axes and moving along the first through channels 1214. The main arm 1210 includes two pairs of second channels 1216 located at opposite ends thereof respectively. The second channels 1216 in each pair of second channels 1216 are parallel to each other. The tall locating arm 74 can slide along a first pair of the sliding channels 7312, and the short locating arm 75 can slide along a second pair of the sliding channels 7312. The first location blocks 124 can slide along a first pair of the second channels 1216, and can then be fixed at respective desired positions.

Figure 3:
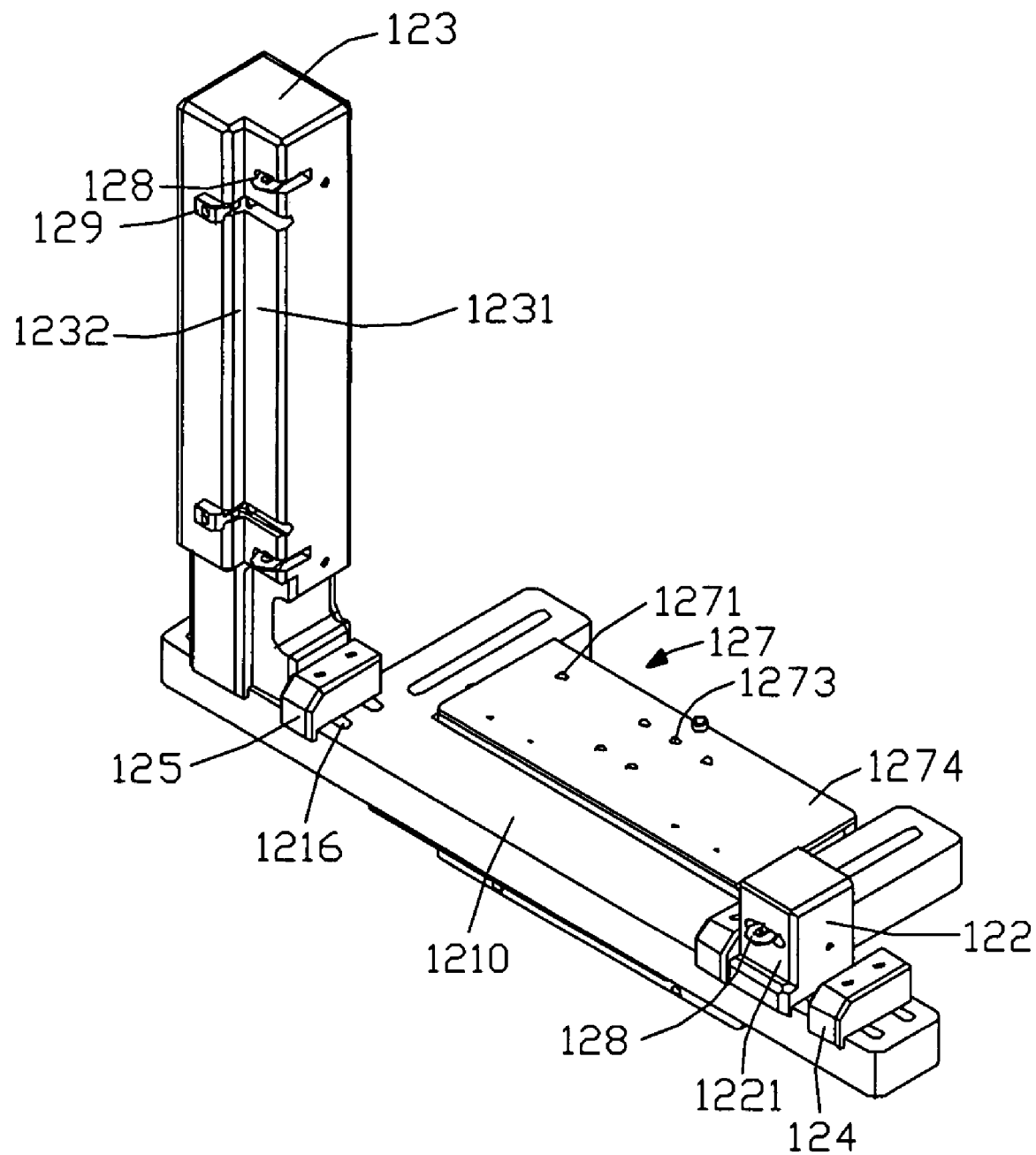
FIG. 3 is an assembled, front view of the locating member of FIG. 2, the locating member including three first sensors and two second sensors.

Referring also to FIG. 3, the short locating arm 122 and the first location blocks 124 are located at one of the ends of the main arm 1210, and can slide along the corresponding second channels 1216. The first location blocks 124 can abut two opposite sides of the short locating arm 122 and then be fixed in position. Thus, the first location blocks 124 sandwich the short locating arm 122 therebetween and fix the short locating arm 122 in a desired position. The short locating arm 122 includes a first reference surface 1221 perpendicular to a top side of the main arm 1210. A first sensor 128 is arranged at the first reference surface 1221.

The tall locating arm 123 and the second location block 125 are located at the other end of the main arm 1210, and can slide along the corresponding second channels 1216. The second location block 125 is located between the short locating arm 122 and the tall locating arm 123. Thus, a distance between the tall locating arm 123 and the short locating arm 122 can be adjusted by using the second location block 125. Therefore, the verticality examining apparatus 1 can be used to examine verticality of liquid crystal displays having different vertical sizes. The tall locating arm 123 includes a second reference surface 1231 coplanar with the first reference surface 1221, and a third reference surface 1232 perpendicularly connected with the second reference surface 1231, thus defining an essentially rectangular corner (not labeled). Two first sensors 128 are arranged at the second reference surface 1231, and two second sensors 129 are arranged at the third reference surface 1232. Outmost extremities (not labeled) of the three first sensors 128 cooperatively define an imaginary planar surface. Outmost extremities of the second sensors 129 cooperatively define a line parallel to that defined by two of the first sensors 128 located at the second reference surface 1231.

Figure 4:
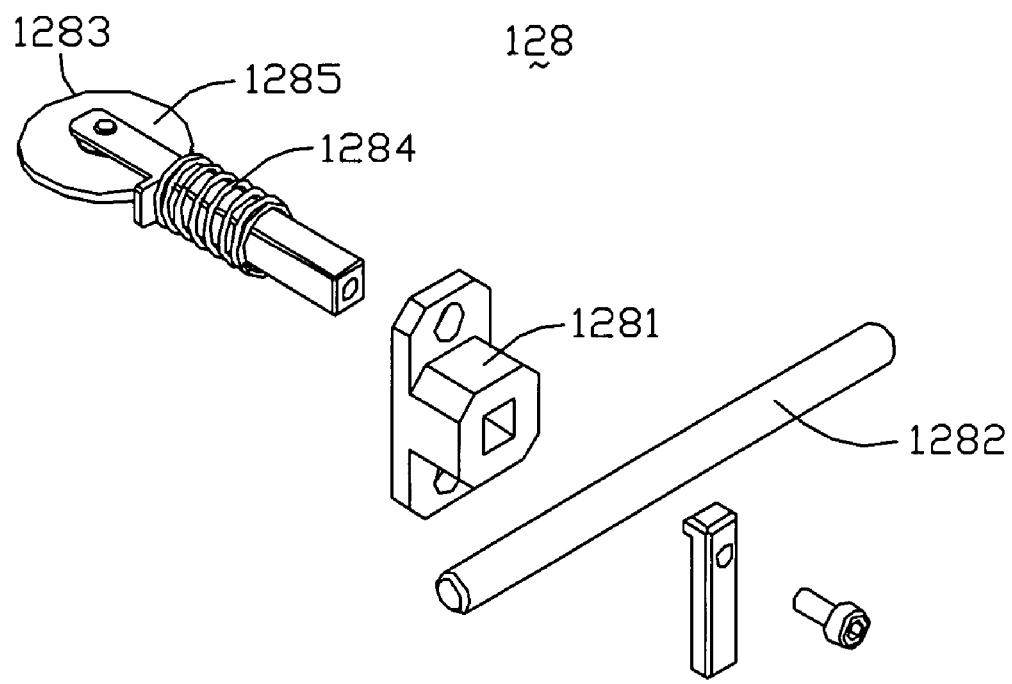
FIG. 4 is an exploded, isometric view of one of the first sensors of FIG. 3.

Referring to FIG. 4, each first sensor 128 includes a first positive terminal 1281, a first negative terminal 1282, and a first spring structure 1283 having a first spring 1284 and a wheel 1285. The first positive terminal 1281 and the first negative terminal 1282 are each connected to a respective wire (not shown). The first sensor 128 is configured to be in a normal switched-off state when the wheel 1283 is free from external forces, and to be in a switched-on state when an external force is applied to the wheel 1285. That is, when an external force is applied to the wheel 1285, the first spring structure 1283 is displaced inward and provides mechanical and electrical interconnection between the first positive terminal 1281 and the first negative terminal 1282. In this process, the first spring 1284 is compressed. When the external force is removed, the first spring 1284 decompresses and drives the first spring structure 1283 outward, whereby the above-stated mechanical and electrical interconnection is broken.

Figure 5:
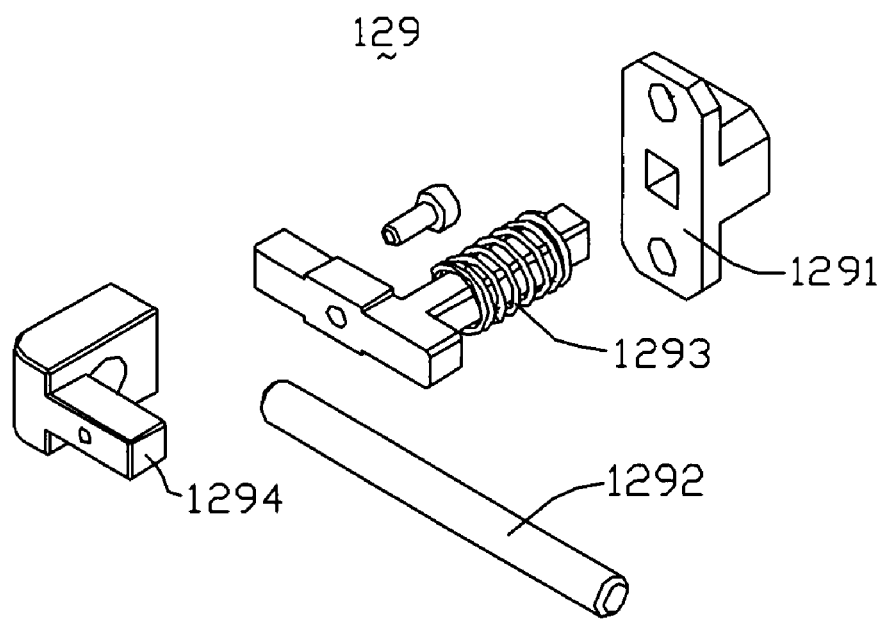
FIG. 5 is an exploded, isometric view of one of the second sensors of FIG. 3.

Referring to FIG. 5, each second sensor 129 includes a second positive terminal 1291, a second negative terminal 1292, a second spring structure 1293, and a contact terminal 1294. The second positive terminal 1291 and the second negative terminal 1292 are each connected to a respective wire (not shown). The second sensor 129 is configured to be in a normal switched-off state when the contact terminal 1294 is free from external forces, and to be in a switched-on when an external force is applied to the contact terminal 1294. The outmost extremities of the first sensors 128 and the second sensors 129 are elastic.

The control circuit box 127 includes a control circuit (not shown), a power-on indicator 1271, five sensor-indicators 1273, and a housing 1274. The first sensors 128 and the second sensors 129 are connected to the control circuit via the flexible printed circuit 126. The power-on indicator 1271 shows whether the control circuit is in a working state or not. Each sensor-indicator 1273 is connected to the control circuit to show a corresponding state of a respective one of the first sensors 128 or second sensors 129.

Figure 6:
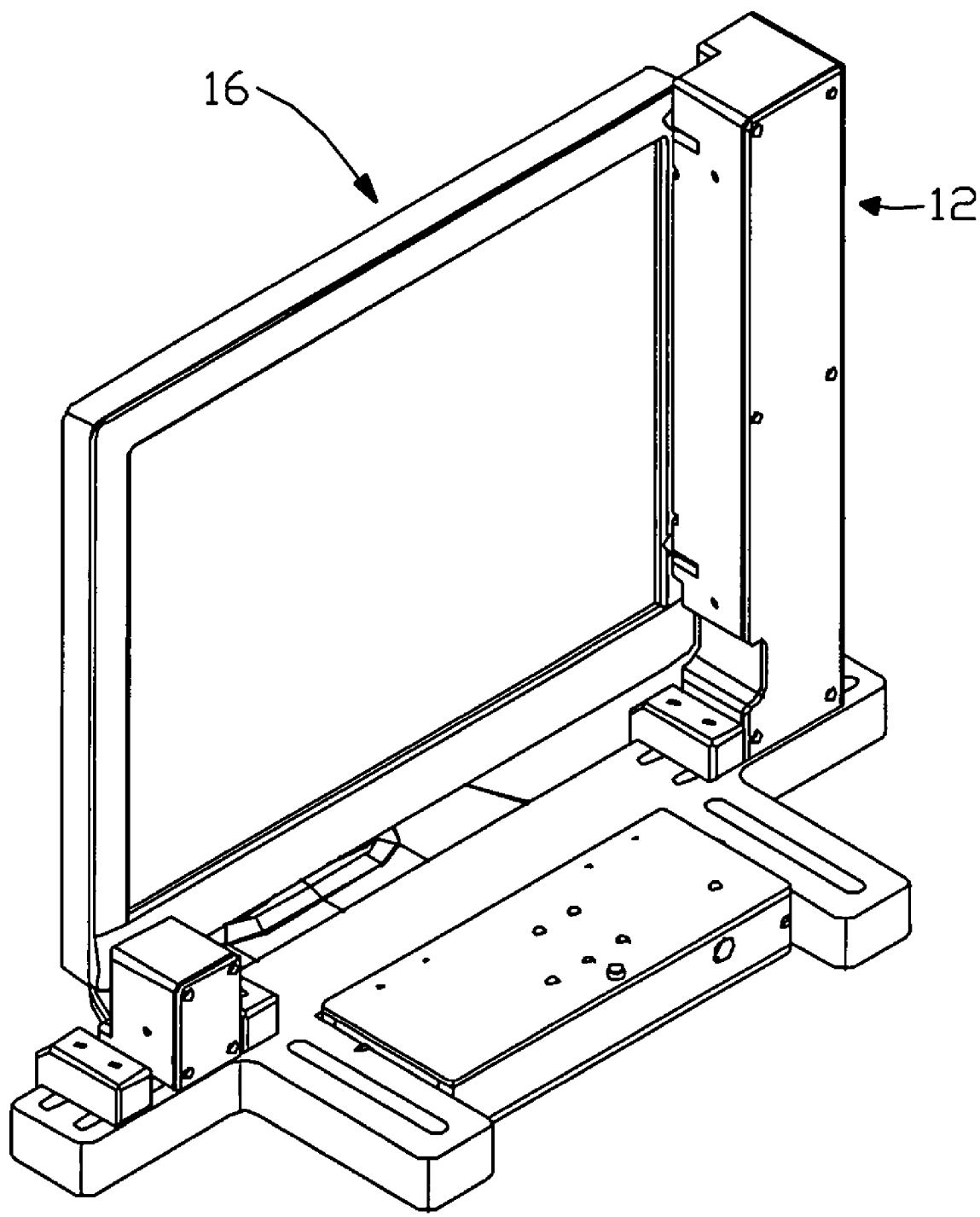
FIG. 6 is similar to FIG. 2, but showing the locating member fully assembled, and showing a liquid crystal display abutting the locating member and ready for examination by the verticality examining apparatus of the exemplary embodiment.
Figure 7:
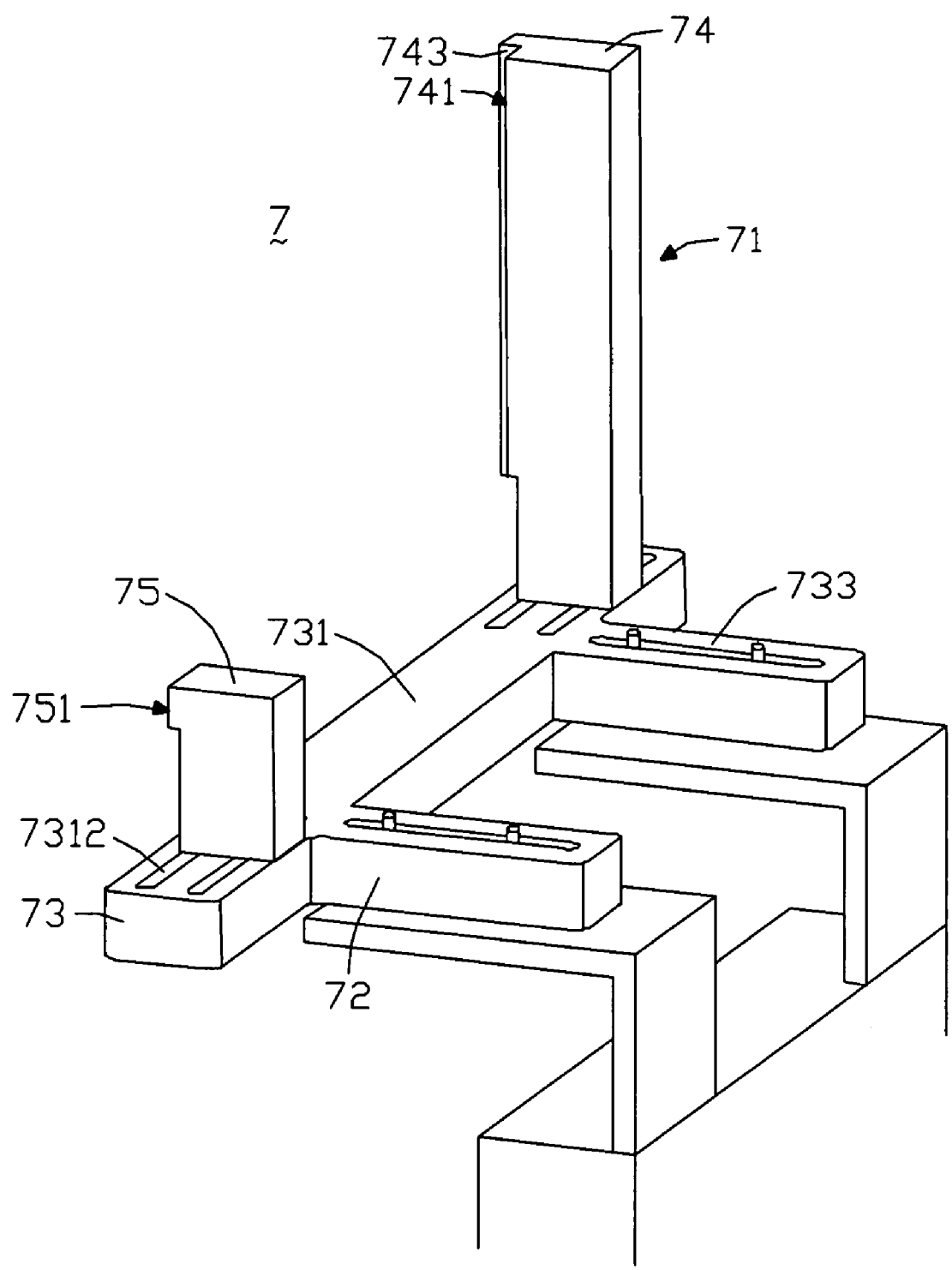
FIG. 7 is an isometric, back view of a conventional verticality examining apparatus.
Figure 8:
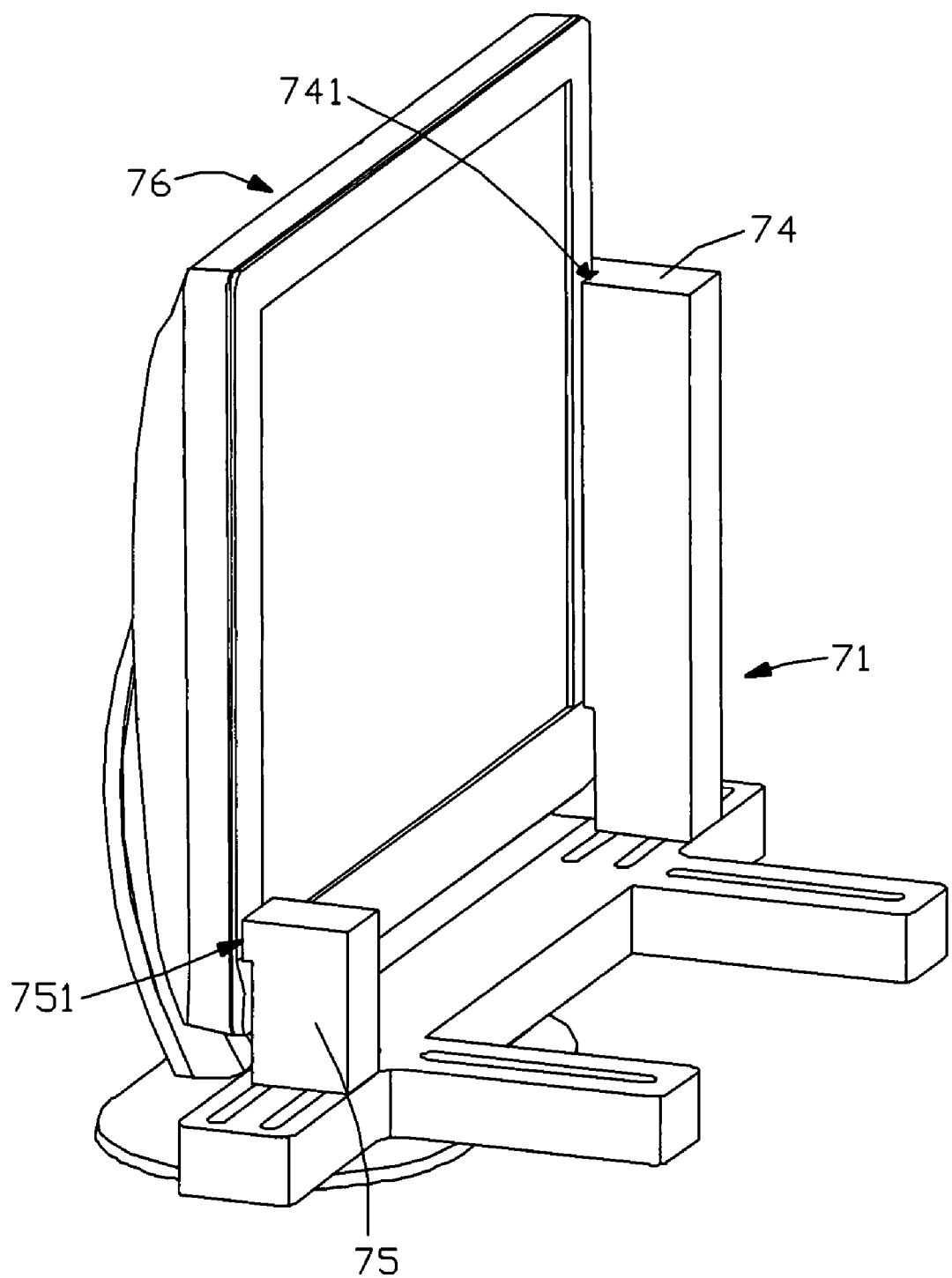
FIG. 8 is similar to FIG. 7, but showing a liquid crystal display abutting the verticality examining apparatus and ready for examination using the verticality examining apparatus.

Referring also to FIG. 6, an exemplary method to examine the verticality of a liquid crystal display 16 may include the following steps. First, the distance between the tall locating arm 123 and the short locating arm 122 is adjusted by moving the first and second location blocks 124, 125. Then the first and second location blocks 124, 125 are fixed in position. The distance corresponds to a horizontal size of the liquid crystal display 16. The liquid crystal display 16 displays a cross on a screen thereof, with a center of the cross being at a center of the screen. Second, a height of the observing scope 144 is adjusted and fixed, such that the alignment cross of the observing lens coincides with the center of the cross on the screen of the liquid crystal display 16. Third, the liquid crystal display 16 is pressed forward until the wheels 1285 of the three first sensors 128 are contacted by front portions of the liquid crystal display 16. Thus, the sensor-indicators 1273 corresponding to the first sensors 128 indicate to show that the front portions of the liquid crystal display 16 are coplanar. If the contact terminals 1294 of the second sensors 129 are pressed by a right side portion of the liquid crystal display 16, the other two sensor-indicators 1273 corresponding to the second sensors 129 indicate this. In such case, said other two sensor-indicators 1273 cooperatively indicate to show that the verticality of the liquid crystal display 16 is satisfactory. On the contrary, if at least one of said other two sensor-indicators 1273 remains in a power-off state, this shows the verticality of the liquid crystal display 16 is unsatisfactory.

With the above-described configuration, the verticality of the liquid crystal display 16 can be efficiently and accurately determined by observing the sensor-indicators 1273. Thus, the efficiency of manufacturing and quality control of the liquid crystal display 16 is improved. In addition, the outmost extremities of the first and second sensors 128, 129 are elastically movable. This helps prevent the liquid crystal display 16 from being scraped by the first or second sensors 128, 129.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A verticality examining apparatus comprising:
    a first locating arm comprising:
        a first reference surface; and
        a first sensor located at the first reference surface;
    a second locating arm comprising:
        a second reference surface coplanar with the first reference surface;
        a pair of first sensors located at the second reference surface, outmost extremities of the three first sensors cooperatively defining an imaginary planar surface;
        a third reference surface perpendicular to the second reference surface; and
        two second sensors located at the third reference surface, outmost extremities of the second sensors cooperatively defining an imaginary line parallel to that defined by the pair of first sensors located at the second reference surface; and
    a control circuit electrically connected to the first sensors and the second sensors, and configured for indicating states of the first and second sensors when an object to be examined is placed in abutment with the first sensors.

2. The verticality examining apparatus as claimed in claim 1, wherein the first locating arm and the second locating arm are essentially parallel to each other.

3. The verticality examining apparatus as claimed in claim 1, wherein each first sensor is configured to be in a normal switched-off state when the first sensor is free from external forces, and to be in a switched-on state when an external force is applied to the first sensor.

4. The verticality examining apparatus as claimed in claim 1, wherein each second sensor is configured to be in a normal switched-off state when the second sensor is free from external forces, and to be in a switched-on state when an external force is applied to the second sensor.

5. The verticality examining apparatus as claimed in claim 1, wherein the control circuit is electrically connected to five sensor-indicators, and each sensor-indicator is configured for indicating states of the first and second sensors with respect to any physical contact with the object.

6. The verticality examining apparatus as claimed in claim 5, wherein the sensor-indicators are connected to the control circuit via a flexible printed circuit.

7. The verticality examining apparatus as claimed in claim 1, wherein a distance between the first locating arm and the second locating arm is adjusted corresponding to a horizontal size of the object.

8. The verticality examining apparatus as claimed in claim 1, wherein the outmost extremities of the first sensors and the second sensors are elastic.

9. The verticality examining apparatus as claimed in claim 1, wherein each of the first sensors or the second sensors comprises a terminal for being applied with external forces.

10. A verticality examining apparatus comprising:
    three first sensors each having outmost extremities, the outmost extremities cooperatively defining an imaginary single plane, and configured for physically contacting a first side of an object to be examined;
    two second sensors configured for simultaneously physically contacting a second side of the object when the first side of the object contacts the first sensors, if the object has verticality as between the first side and the second side thereof; and
    a plurality of sensor-indicators electrically connected to the first and second sensors and configured for indicating states of the first and second sensors with respect to any physical contact with the object.

11. The verticality examining apparatus as claimed in claim 10, wherein each first sensor is configured to be in a normal switched-off state when the first sensor is free from external forces, and to be in a switched-on state when an external force is applied to the first sensor.

12. The verticality examining apparatus as claimed in claim 10, wherein each second sensor is configured to be in a normal switched-off state when the second sensor is free from external forces, and to be in a switched-on state when an external force is applied to the second sensor.

13. The verticality examining apparatus as claimed in claim 10, wherein the outmost extremities of the first sensors and the second sensors are elastic.

14. The verticality examining apparatus as claimed in claim 10, wherein each of the first sensors or the second sensors comprises a terminal for being applied with external forces.

15. A method of investigating a correct contour of a liquid crystal display comprising:
    providing a frame with an interior inward right angle groove structure formed by at least a horizontal plane and a vertical plane;
    providing three first sensors located on the horizontal plane;
    providing two second sensors located on the vertical plane;
    installing a liquid crystal display to the frame; and
    checking whether all said first and second sensors are activated.

* * * * *